(12) United States Patent
Barske

(10) Patent No.: US 7,377,344 B2
(45) Date of Patent: May 27, 2008

(54) HYBRID DRIVE SYSTEM FOR A MOTOR VEHICLE

(75) Inventor: Heiko Barske, Seefeld (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 11/432,492

(22) Filed: May 12, 2006

(65) Prior Publication Data

US 2006/0266568 A1 Nov. 30, 2006

Related U.S. Application Data

(63) Continuation of application No. PCT/EP2004/012938, filed on Nov. 15, 2004.

(30) Foreign Application Priority Data

Nov. 14, 2003 (DE) ............... 103 53 256

(51) Int. Cl.
*B60K 20/00* (2006.01)
*B60W 10/00* (2006.01)
(52) U.S. Cl. ............ 180/65.2; 903/918; 903/946
(58) Field of Classification Search ........ 180/65.2, 180/65.3; 701/22; 903/946, 940
See application file for complete search history.

(56) References Cited

U.S. PATENT DOCUMENTS

| | | | |
|---|---|---|---|
| 5,887,670 A * | 3/1999 | Tabata et al. ............ | 180/65.2 |
| 5,934,395 A | 8/1999 | Koide et al. | |
| 6,018,198 A | 1/2000 | Tsuzuki et al. | |
| 6,077,186 A * | 6/2000 | Kojima et al. ............ | 477/3 |
| 6,637,530 B1 * | 10/2003 | Endo et al. ............ | 180/65.2 |
| 6,722,332 B2 * | 4/2004 | Kojima ............ | 123/179.3 |

(Continued)

FOREIGN PATENT DOCUMENTS

DE 29 43 554 A1 5/1981

(Continued)

OTHER PUBLICATIONS

German Office Action dated Jun. 17, 2004 Including English Translation (Seventeen (17) pages).

*Primary Examiner*—Christopher Bottorff
(74) *Attorney, Agent, or Firm*—Crowell & Moring LLP

(57) ABSTRACT

A hybrid drive system for a vehicle, comprising an internal-combustion engine, a generator, an electric motor, an electric energy accumulator, and a connection device for establishing mechanical connections between the internal-combustion engine, the generator, the electric motor and the vehicle, and a control device. The control device controls a converter device and, as required, the connection device such that the internal-combustion engine is used exclusively for driving the vehicle only if it operable in an operating range in which the operation could also take place only with an electromotive drive, with a specific fuel consumption ESVE lower than ESVL/(G×B×M), wherein ESVL is the effective specific fuel consumption with which the generator was driven during the charging of the energy stored in the electric energy accumulator, G is the efficiency with which the generator converts the mechanical driving power into electric power, B is the efficiency with which the electric power generated in the generator is stored as energy in the electric energy accumulator and is supplyable to the driving motor, and M is the efficiency with which the electric power in the driving motor is convertible into mechanical energy.

30 Claims, 4 Drawing Sheets

U.S. PATENT DOCUMENTS

| | | | |
|---|---|---|---|
| 6,902,512 B2 * | 6/2005 | Kamichi et al. | 477/108 |
| 2003/0010548 A1 | 1/2003 | Mesiti et al. | |

FOREIGN PATENT DOCUMENTS

| | | |
|---|---|---|
| DE | 41 13 386 A1 | 10/1992 |
| DE | 42 17 668 C1 | 5/1993 |
| DE | 43 44 053 A1 | 7/1994 |
| DE | 197 49 548 A1 | 10/1998 |
| DE | 199 06 601 A1 | 9/1999 |
| DE | 198 31 487 C1 | 3/2000 |
| DE | 199 17 276 A1 | 10/2000 |
| DE | 102 13 560 A1 | 10/2002 |
| EP | 0 930 193 A2 | 7/1999 |
| JP | 2-7702 A | 1/1990 |
| WO | WO 00/15455 A2 | 3/2000 |

* cited by examiner

HYBRID DRIVE SYSTEM FOR A MOTOR VEHICLE

CROSS-REFERENCE TO RELATED APPLICATIONS

This application is a continuation of PCT Application No. PCT/EP2004/012938 filed on Nov. 15, 2004, which claims priority to German Application No. 103 53 256.0 filed Nov. 14, 2003, the disclosures of which are incorporated by reference herein.

BACKGROUND AND SUMMARY OF THE INVENTION

The invention relates to a hybrid drive system for a motor vehicle, which hybrid drive system contains an internal-combustion engine, a generator, an electric motor, an electric energy accumulator coupled with the generator and the electric motor by way of a controllable converter device for controlling the electric energy flow, a connection device for establishing mechanical couplings between the internal-combustion engine, the generator, the electric motor and the vehicle, and a control device for controlling the converter device and the connection device as a function of the charge state of the energy accumulator and the drive power demand of the vehicle.

Because of the increasing importance of an improved environmental compatibility of motor vehicles, hybrid drive systems of the above-mentioned type are becoming more significant. They permit the avoidance of an operation of the internal-combustion engine in ranges with a particularly high specific fuel consumption. Such operating ranges are connected with high, route-related fuel consumption of the vehicle as well as with high emission of pollutants.

Hybrid drive systems of the above-mentioned type are known, for example, from German Patent document DE 29 43 554 A1, Japanese Laid-Open Utility Model 2-7702, International Patent document WO 00/15455 and U.S. Pat. No. 5,934,395.

It is an object of the invention to further develop a hybrid drive system of the above-mentioned type such that its environmental compatibility is improved.

Solutions of this object are achieved according to the invention. By designing the hybrid drive system according to an aspect of the invention, it is ensured that, when the battery is full, the internal-combustion engine is used for driving the vehicle only if, when driving the vehicle, it runs at an operating point having a specific fuel consumption which is less than the effective specific fuel consumption which occurs when the vehicle is driven electromotively, and it is taken into account how the energy accumulator was charged.

By means of the hybrid drive system according to another aspect of the invention, it is ensured that the vehicle will be driven by the electric motor only when the respective driving power cannot be provided more economically by the internal-combustion engine.

In accordance with further aspects of the invention, it is ensured that the electric energy accumulator is recharged with the best possible effective specific fuel consumption.

Further advantageous embodiments and further developments of the hybrid drive systems according to the invention are described and claimed herein.

In accordance with still further aspects of the invention, it is ensured that, in each case, the recharging of the electric energy accumulator always takes place with the lowest possible fuel consumption of the internal-combustion engine.

Additionally, the basic design of the control device is such that the vehicle can always be driven with the lowest possible effective fuel consumption.

It can be ensured by means of other aspects of the invention that the energy accumulator always contains a sufficiently large energy reserve which at least makes possible a reliable starting of the internal-combustion engine from the energy accumulator.

In accordance with another aspect of the invention, it is achieved that, in certain operating conditions, for example, when the electric energy accumulator is still substantially full, a recharging will take place only when the energy, which will be additionally stored in the energy accumulator, will be generated with a better efficiency than the energy still present in the energy accumulator.

In accordance with another aspect of the invention, it is achieved that the operating behavior of the hybrid system can be adapted to a predetermined, repeatedly traveled route such that this route will be traveled with minimal fuel consumption.

Further aspects of the invention are aimed at the advantageous dimensioning of components of the hybrid drive system, at possibilities of starting the internal-combustion engine in the case of a particularly simple embodiment of a hybrid drive system, and at a particularly advantageous and simple embodiment of the hybrid drive system.

Advantageously, a two-cycle internal-combustion engine can be used in a hybrid drive system according to the invention because operation of the internal-combustion engine can be avoided in operating ranges in which the two-cycle method presents problems.

Other objects, advantages and novel features of the present invention will become apparent from the following detailed description of the invention when considered in conjunction with the accompanying drawings.

DETAILED DESCRIPTION OF THE DRAWINGS

Figure 1:
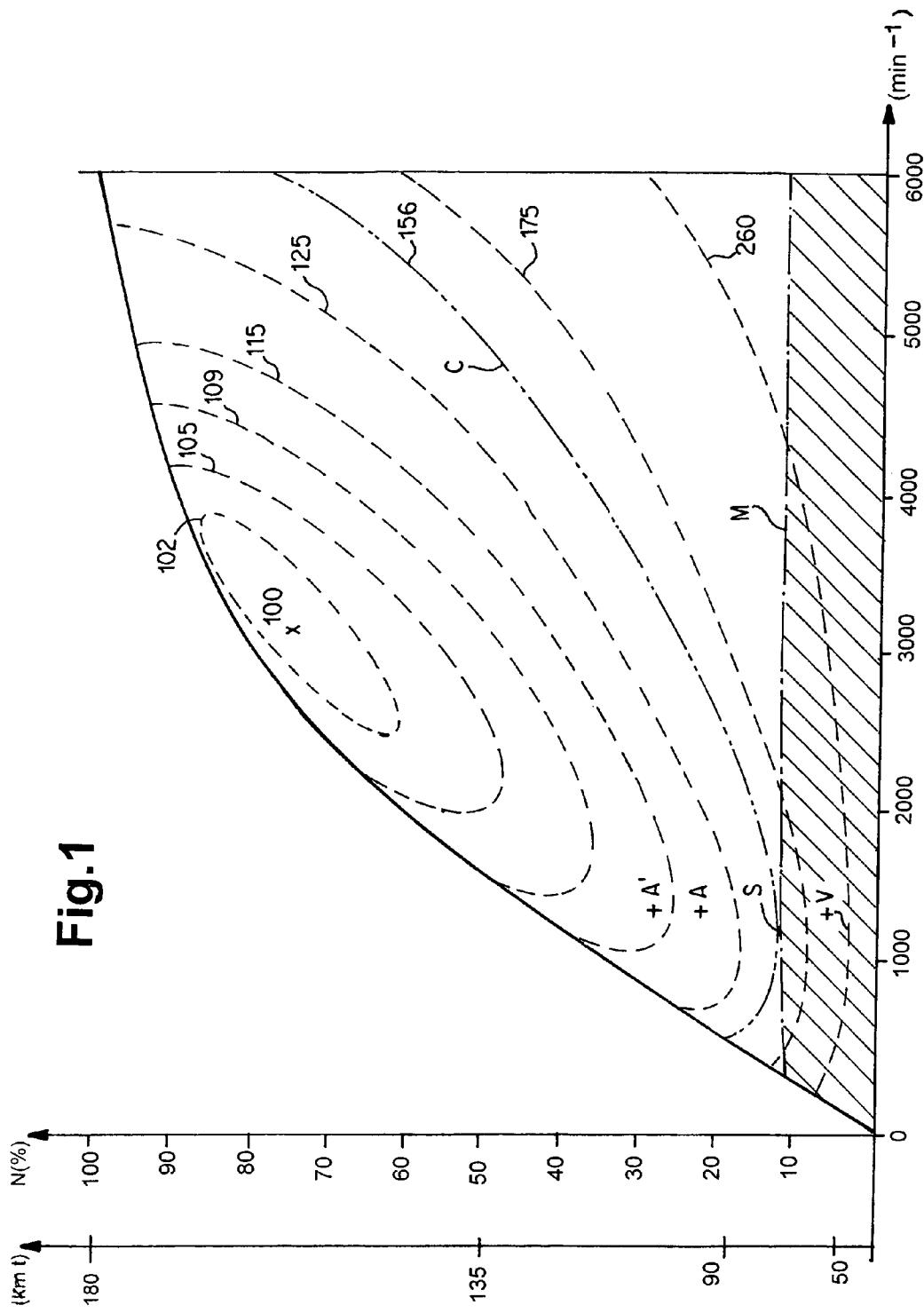
FIG. 1 is a characteristic fuel consumption diagram by which a principle of the hybrid drive system according to the invention is explained.

FIG. 1 is a schematic view of a power-fuel consumption characteristic diagram of an Otto engine. On the ordinate, power N is indicated, for example, as a percentage of the full output or, for a special example, is indicated directly in kW. The abscissa indicates the rotational speed of the internal-combustion engine in $\text{min}^{-1}$. The broken conchoidal curves are curves of the same specific fuel consumption (g/kWh), wherein 100 indicates the minimal specific fuel consumption (best point) and the additional curves indicate the respective specific fuel consumptions relative to the best point. The speeds, which an exemplary vehicle reaches at the respective drive powers on a flat road, are indicated on a second ordinate. The characteristic diagram of a diesel engine is basically similar, but the fuel consumption increases are not as large.

In the following, it is assumed that the internal-combustion engine is installed in a vehicle together with a generator, an electric drive motor and an electric energy accumulator, such as a battery. In this case, the generator and the drive motor can be combined in an electric machine. The internal-combustion engine can be used for driving the vehicle and/or the generator, and the electric drive motor can be used alone or jointly with the internal-combustion engine for driving the vehicle. When it is driven by the internal-combustion engine, the generator supplies electric power into an electric energy accumulator, such as a battery. The electric drive motor is supplied with current from the battery and/or, as required, directly from the generator. The transmission ratios between the internal-combustion engine and the vehicle, as well as between the internal-combustion engine and the generator and the drive motor and the generator, should advantageously be widely adjustable by using corresponding transmissions. Likewise, it will be assumed that the internal-combustion engine should be arbitrarily coupleable with the vehicle and/or the generator, and the drive motor should be arbitrarily coupleable with the vehicle.

It will further be assumed that the generator is designed for a mechanical drive power of approximately 20 kW, wherein this mechanical power can be generated by the internal-combustion engine at a rotational speed of 1,200 $min^{-1}$, with a best possible specific fuel consumption of approximately 120. This operating point is marked A in FIG. 1.

It will further be assumed that the generator has an efficiency G of 0.95; the drive motor has an efficiency M of also 0.95; and the battery has a charging/discharging efficiency B (including all conversion and resistive losses) of 0.85.

Under the above-mentioned assumptions, the effective specific fuel consumption ESVE, at which the vehicle can be driven with the internal-combustion engine operating at operating point A and solely driving the generator, storing the generated electrical energy in the battery and, in turn, drawing the electrical energy from the battery $A/(B \times G \times M)$, equals 156. The line, on which the internal-combustion engine is running with a specific fuel consumption of 156, is indicated in FIG. 1 by a double-dot dash line (curve C).

When the battery is full, it is therefore not economical to drive the vehicle using the internal-combustion engine as soon as the latter runs with a specific fuel consumption of more than 156, provided the electric drive system (battery and electric motor) can supply the required mechanical drive power with the above-mentioned efficiencies.

As further illustrated in the diagram of FIG. 1, irrespective of its rotational speed, the internal-combustion engine is incapable of supplying power less than 12 kW (minimum S of curve C) with a specific fuel consumption better than the ESVE. When the energy accumulator is full, the shaded area is therefore completely eliminated for driving of the vehicle using the internal-combustion engine; that is, constant speeds on a flat road of up to approximately 70 km/h, when the electric energy accumulator is full, are driven exclusively by means of the drive of the electric drive motor.

As soon as a drive power of more than 12 kW is required when the energy accumulator is full, it is economical to generate this drive power by using the internal-combustion engine if the internal-combustion engine can be operated at a characteristic diagram point above the curve C.

When additional drive power is required, for example, for accelerating or for driving up slopes, the internal-combustion engine is controlled at an operating point at which it operates with a clearly better specific fuel consumption than ESVE. If the power is not sufficient, the drive torque of the electric motor can be switched on.

The above-mentioned conditions apply in the event that the energy stored in the battery was generated by the internal-combustion engine running at the operating level A. The circumstances change if the energy accumulator or the battery can be recharged.

As illustrated in FIG. 1, in the case of a drive power demand of, for example, 5 kW and a rotational speed of 1,200 $min^{-1}$ (Point V), the internal-combustion engine can be changed to operating level A' by additional driving the generator with a drive power of 20 kW, wherein it generates 25 kW with a specific fuel consumption of less than 115. If there is a load on the generator, it is therefore expedient to utilize the internal-combustion engine for driving the vehicle, even if the required drive power is low, provided that the internal-combustion engine then runs with a specific fuel consumption lower than at the operating point A. When the battery is recharged by an internal-combustion engine running at the operating point A', the vehicle can be operated electrically with an effective fuel consumption ESVE=A'/ $(B \times G \times M)$=126.

It is illustrated by the above that, when the battery is full, it is generally expedient to use the internal-combustion engine exclusively for driving the vehicle only if it is at an operating point at which it would be possible per se to also drive only with the electromotive drive, with a specific fuel consumption lower than ESVE=ESVL/$(B \times G \times M)$, wherein ESVL is the effective and/or average specific fuel consumption, with which the drive energy of the generator for charging the battery was generated. It is understood that ESVL is lowered by means of energy recovery when braking the vehicle using the generator.

With respect to efficiency aspects, it is expedient to recharge the battery at the point in time (in the illustrated example) when the internal-combustion engine driving the generator and possibly the vehicle, runs at approximately 3,200 $min^{-1}$ and a power of approximately 75% of the maximal power. Depending on the rated drive power of the generator and the required drive power of the vehicle, this can take place only in limited driving conditions. The rated drive power of the generator is that driving power at which the generator supplies its nominal power as electric power; that is, for which it and the electric system connected to the output side, such as the AC/DC converter, the electric lines and the battery, are designed. Generally, the rated power corresponds to that power at which the system operates without noticeable resistive losses. The continuous current intensities are, for example, between 50 and 100 A, wherein brief overloads are possible. As illustrated in FIG. 1, the specific fuel consumption of the internal-combustion engine, as a result of the additional driving power for the generator, generally falls more, the lower the rotational speed and the power of the internal-combustion engine. By influencing the valve control timings of the internal-combustion engine, it becomes possible to shape the curves of the same specific fuel consumption such that they lead on the left of the best point diagonally toward the left top and on the right of the best point diagonally toward the right bottom into the maximal power curve.

Since the curve c depends on the specific fuel consumption of the internal-combustion engine during the recharging of the battery, it is expedient to detect the specific fuel consumption during the recharging of the battery, and to compute the effective specific fuel consumption ESVE therefrom, with which the driving can then take place from the battery.

Figure 2:
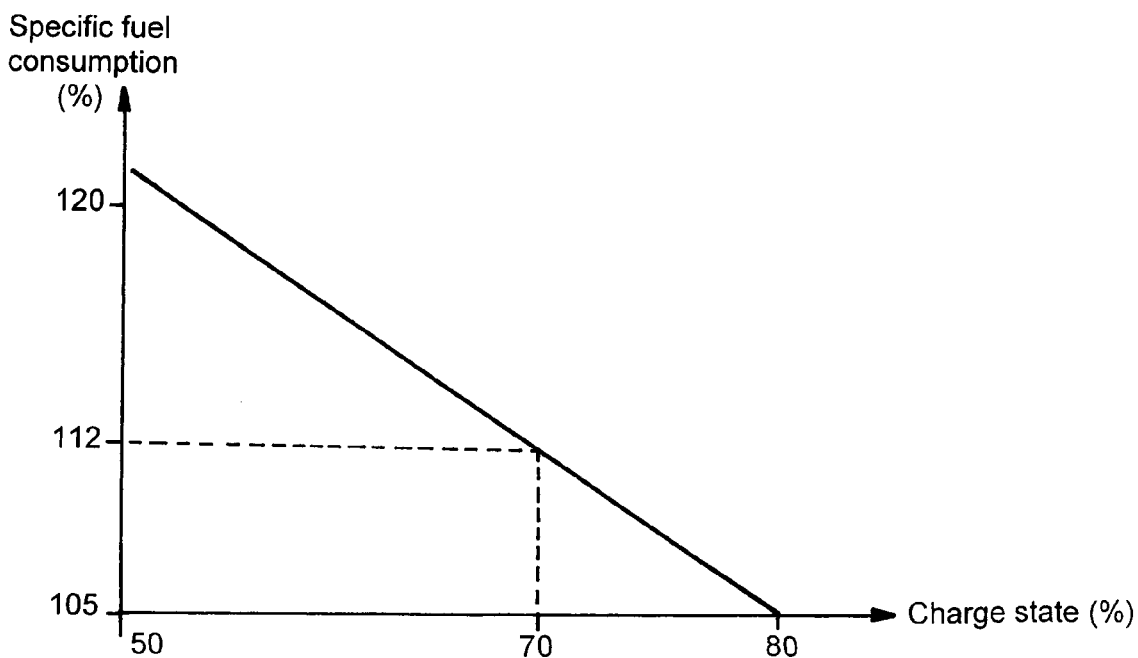
FIG. 2 is a graphic representation for explaining an advantageous charging strategy.

So that, if required energy will be available from the battery, i.e., particularly for the starting of the internal-combustion engine, it is expedient not to let the charge state of the battery fall below a predetermined value. An advantageous charging strategy includes the fact that the specific fuel consumption of the internal-combustion engine, at which the recharging takes place, decreases as the energy stored in the battery increases. This is illustrated in FIG. 2.

The ordinate shows the specific fuel consumption with which the internal-combustion engine is running when it drives the generator and, as required, additionally the vehicle. The abscissa indicates the charge state of the battery. The indicated straight line, which may also be a curved line, shows the respective charge states of the battery at which recharging takes place, as a function of the specific fuel consumption. The example shown by the broken line indicates that, in case the battery has a charge state of 70%, recharging takes place only if it can be done with a specific fuel consumption of the internal-combustion engine below 112. It is understood that such a charging strategy is performed with a hysteresis sufficient for stable switching conditions; that is, a respective charge state is maintained for a short time even if the decision criterion is impaired by the operation of the internal-combustion engine at another load level, for example, by stepping on the gas or by releasing the accelerator.

If the vehicle is frequently operated on a predetermined route—for example, for a daily drive to work—, by means of a learning mode activated, for example, by a driver, the required drive power profile of the vehicle can be detected by sensors and can be stored in a memory device. From (1) the drive power/route profile, (2) the characteristic fuel consumption diagram of the internal-combustion engine, and (3) the existing transmission ratio possibilities between the vehicle, the internal-combustion engine, the generator and the driving motor, an arithmetic-logic unit can compute a management of the internal-combustion engine, of the generator and of the motor and possible transmissions and clutches in such a manner that the route is traveled in a consumption-optimal manner while expediently using the three above-mentioned components, wherein a boundary condition may, for example, include the fact that the battery is at least substantially full at the end of the route. For this optimization computation, the progression of the speed along the repeatedly-driven route is, for example, stored in the learning mode, and the time progression of the speed or the time progression of the drive power demand and of the braking power is determined therefrom. From the speed progression and the power progression, by means of the possible transmission ratios, the progression of the traveled operating points of the internal-combustion engine can be computed while taking into account the operation of the generator and of the drive motor, and thus of the charge state of the battery, while optimizing the total fuel consumption and defining of the battery charge state at the start and the end of the traveled route.

It is expedient to rate the maximal power of the internal-combustion engine such that the internal-combustion engine is suitable for solely driving the vehicle at its maximal continuous speed (in the illustrated example 100 kW for 180 km/h).

With respect to the generator, it is expedient to rate its nominal drive power such that it corresponds to at least that maximal power which the internal-combustion engine supplies in the case of a defined specific fuel consumption A and the thus lowest possible rotational speed. It is particularly advantageous to rate the nominal drive power of the generator such that it corresponds approximately to the power which the internal-combustion engine maximally supplies at its lowest permissible rotational load speed, in the illustrated example, at 1,200 min$^{-1}$, approximately 40 kW. In this manner, it is ensured that also, in the event of a long-lasting low drive demand, for example, in city traffic, the battery can be recharged with high efficiency. Rating the generator for a higher rated power requires a larger and therefore more expensive rating of the entire electric system, including the battery, but has the advantage, that the recharging can take place more rapidly and with a still lower specific fuel consumption of the internal-combustion engine. However, the reduction of the specific fuel consumption by an additional loading of the internal-combustion engine decreases from the left bottom toward the right top, as illustrated in FIG. 1.

Advantageously, the rated power of the electric drive motor is to be adapted to the rated power of the generator, so that the current intensity supplied to the battery at the rated power of the generator is approximately as large as the current intensity drawn from the battery at the rated power of the motor.

During the drive of the generator and/or the motor (switching over to the generator operation) when the vehicle is braked, the electric system may be overloaded for a short time, so that the kinetic energy of the vehicle can be effectively stored in the battery.

In the following, exemplary hybrid drive systems will be explained with the help of FIGS. 3-5 which, with respect to possible transmission ratios, are subjected to various limitations.

Figure 3:
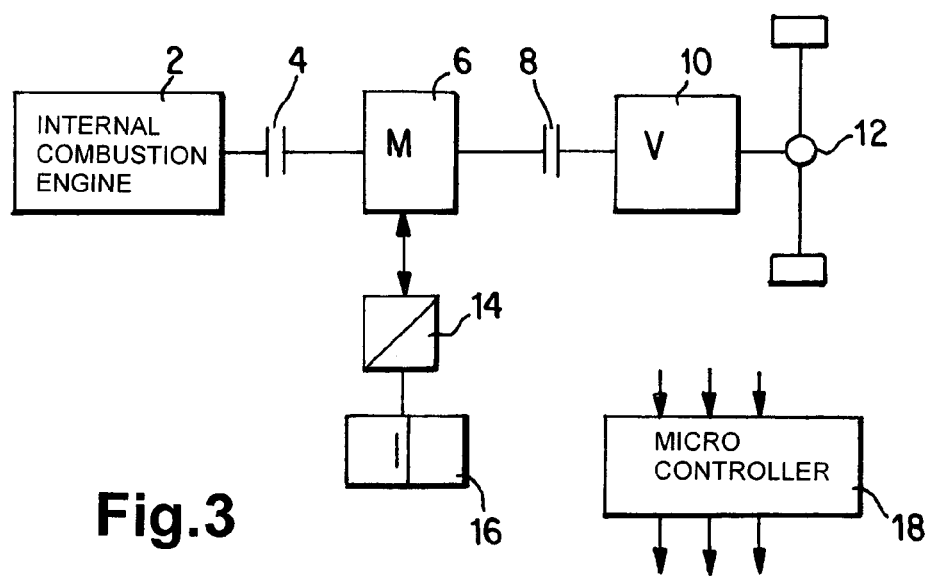
FIGS. 3 to 5 are block diagram views of known examples of hybrid drive systems.

FIG. 3 illustrates a hybrid system which is known from German Patent document 29 43 554 A1 with respect to its similar construction. By way of a first clutch 4, an internal-combustion engine 2 is connected with an electric machine 6 which, in turn, is connected by way of a second clutch 8 with a transmission 10, advantageously an automatic transmission, preferably a transmission with a continuously variable ratio, such as a belt-driven conical-pulley transmission, from which a differential 12 can be driven which leads to the driven wheels of the vehicle. The connection device therefore contains the two clutches 4 and 8 and the transmission 10.

The electric machine 6 can be operated as a generator as well as a motor and can be connected by way of an electronically controllable converter unit 14 (voltage converter, phase control) with an electric energy accumulator 16, advantageously an electrochemical battery and/or one or more supercapacitors.

The internal-combustion engine 2 is advantageously designed such that a large portion of its mass moment of inertia is integrated in the electric machine 6, so that the internal-combustion engine 2 can be rapidly started with low power. The clutch 4 may be a simple drive coupling. The clutch 8 is, for example, an electrically controllable starting clutch; however, it may be constructed as a converter.

For controlling the components having the known construction (the electric components may, for example, have a construction similar to that described in International Patent Publication WO 00/15455), a control device 18 is used which is equipped with a microprocessor and associated memories and whose inputs are connected with sensors not shown in detail, such as an engine speed sensor, a load sensor and a temperature sensor of the internal-combustion engine 2, a sensor for detecting the position of the clutch 4, sensors for detecting the rotational speed of the electric machine 6 as well as the current flow between the electric machine 6 and the energy accumulator 16, a sensor for detecting the position of the clutch 8 as well as a sensor for detecting the ratio of the transmission 10, a sensor for detecting a rotational wheel speed of the vehicle as well as a sensor for detecting the position of an accelerator pedal, by means of which pedal the driver signals that the drive power of the vehicle should be increased or decreased. Outputs of the control device 18 are connected with actuators for controlling the operation of the internal-combustion engine 2, of the clutches 4 and 8 as well as of the transmission 10 and of the converter unit 14 for controlling the operation of the electric machine 6.

The hybrid drive system according to FIG. 3 described in its basic structure has a simple construction and, when the transmission ratios are sufficiently spread, permits an operation of the vehicle at 30 km/h and a minimal on-load speed of 1,000 min$^{-1}$. The battery can be recharged, for example, when the vehicle is not moving (clutch 8 opened), corresponding to the conditions of FIG. 1, so that a purely-electrical light-load start is possible, wherein when the electric machine 6 is rated for a rated power of from 30 to 40 kW, correspondingly high outputs can be electrically provided, and the battery can be recharged also in city traffic by the internal-combustion engine running with specific fuel consumptions around 120. If the generator has a higher rating, even lower specific fuel consumptions are conceivable. On the whole, an operation of the internal-combustion engine can therefore be avoided in operating ranges in which the specific fuel consumption is higher than 120. This results in considerable savings with respect to the fuel consumption in comparison to conventional vehicles, which are operated at a light load (city traffic) with specific fuel consumptions of above 200 or even 300.

It is a characteristic of the drive system according to FIG. 3 that the internal-combustion engine 2, which is largely stationary in the case of a low driving energy demand of the vehicle, is started by the electric machine 6 by a closing of the clutch 4, which, when the clutch 8 is simultaneously closed, may be connected with an unpleasant delay for the vehicle occupants. This brief delay during the start-up can, on the one hand, be counteracted in that a largest-possible portion of the moment of inertia of the internal-combustion engine 2 is placed in the electric machine 6. In addition, this delay can be electronically controlled in that, during the closing of the clutch 4, the electric machine 6 is operated corresponding to the brief power consumption of the internal-combustion engine 2, at a higher driving power, and/or that the first clutch 8 is slightly opened so that the electric machine 6 driving the vehicle runs faster and is braked during the subsequent, preferably simultaneous closing of the clutches 4 and 8. In this case, the released rotational energy of the electric machine 6 can be utilized for driving the internal-combustion engine 2, and/or the ratio of the transmission 10, controlled by the control device 18, is briefly changed to a step-down ratio during the closing of the clutch 4 so that the released rotational energy of the electric machine 6 will be available for starting the internal-combustion engine 2.

Figure 4:
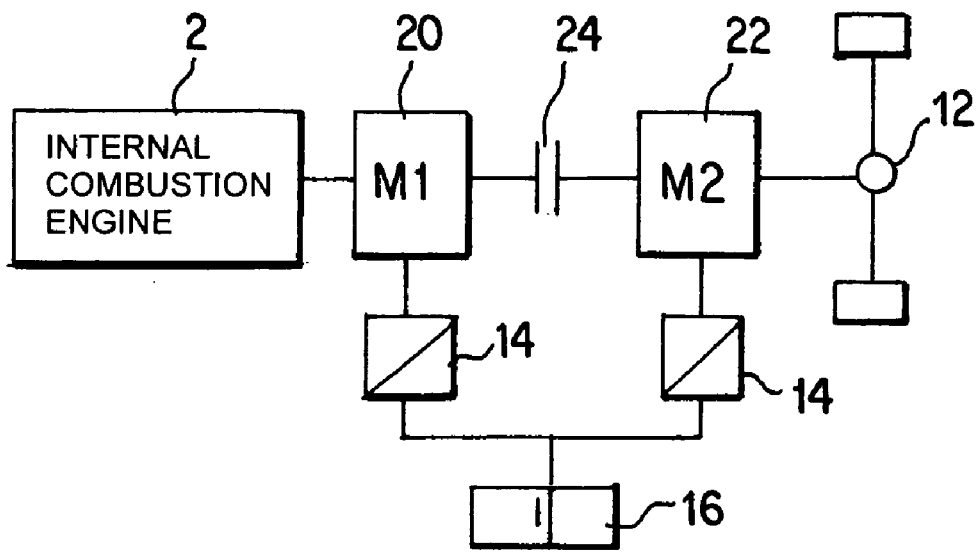

FIG. 4 illustrates another embodiment of a hybrid system, as known with respect to its construction, for example, from Japanese Utility Model 2-7702. This hybrid system contains two electric machines 20 and 22 between which a clutch 24 is arranged. A separate converter unit 14 is assigned to each of the electric machines 20 and 22 and is connected with the battery 16. The control device 18 is not shown.

In the case of the system according to FIG. 4, the internal-combustion engine 2 can be started by the electric machine 20 while the clutch 24 is open irrespective of the driving conditions of the vehicle. While the internal-combustion engine 2 is running, the electric machine 20 preferably operates as a generator. The electric machine 22 preferably operates as a driving motor and, in the illustrated example, is non-rotatably connected with the differential 12 without a transmission.

It is an advantage of the system according to FIG. 4 that, because of the possible decoupling between the internal-combustion engine 2 and the generator 20, on the one hand, and the driving motor 22 and the vehicle by way of the open clutch 24, on the other hand, the generator 20 can be operated at its rated power with the lowest possible specific fuel consumption of the internal-combustion engine corresponding to this power. When the clutch 24 is closed, as a result of the rotational speed connection between the internal-combustion engine 2 and the vehicle, it is not possible to select the rotational speed of the internal-combustion engine such that a lowest possible fuel consumption is achieved when the internal-combustion engine is additionally loaded with the generator torque and/or the generator power. Because of the fact that two electric machines are present, a very high electric driving power can be made available for a short time and a very high braking of the vehicle can be achieved by a simultaneous generator-related operation of both electric machines if the converter units 14 and the battery 16 permit brief overloads. It is understood that, in the case of the system according to FIG. 3, a transmission can be arranged between the motor 22, which is operable as a generator, and the vehicle.

Figure 5:
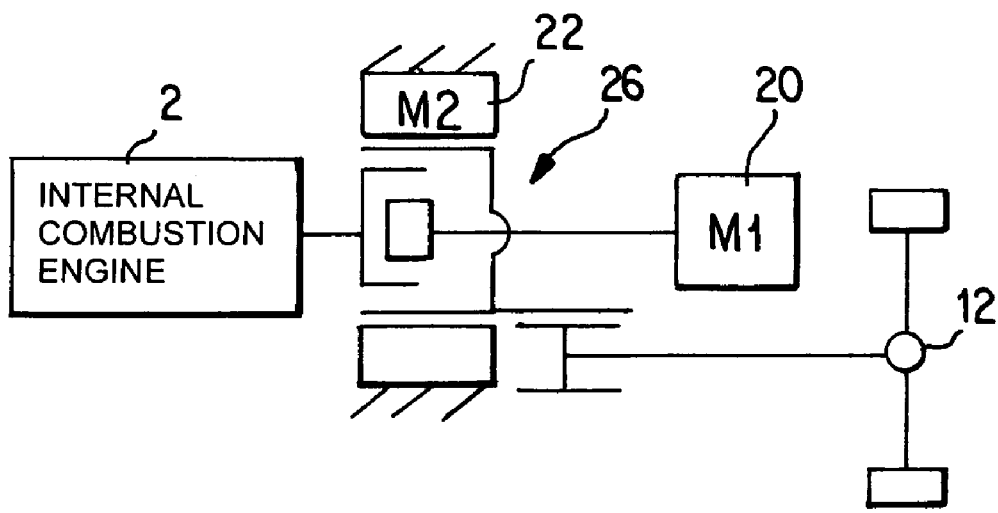

In the case of the system according to FIG. 5, as known with respect to its construction from U.S. Pat. No. 5,934, 395, the internal-combustion engine 2 is connected with the planet carrier of a planetary transmission which, as a whole, is designated with the reference number 26. The sun wheel thereof is connected with a first electric machine 20 and the ring gear thereof forms the rotor of a second electric machine 22, which rotor is fixedly connected with the differential 12 so as to rotate therewith. The converter units assigned to the electric machines and the control device are not shown. The electric machine 20 is preferably operated as a generator. The electric machine 22 is preferably operated as a motor.

Different operating modes are contemplated. When the electric machine 20 is idling, the sun wheel can rotate freely, and the internal-combustion engine 2 has no influence on the vehicle drive or the operation of the electric machine 20. The vehicle is driven only by the electric machine 22.

When the second electric machine 22 is running freely, the internal-combustion engine can drive the vehicle only when the first electric machine 20 is running as a generator, so that the sun wheel cannot rotate freely. The distribution of the power of the internal-combustion engine to the generator and the vehicle drive depends on the power consumption of the generator and/or of the first electric machine 20. The same applies to the rotational speed of the ring gear and therefore to the speed of the vehicle.

In a further mode, the internal-combustion engine 2 and the second electric machine 22 drive the vehicle, while the first electric machine 20 operates as a generator. Overall, the system according to FIG. 4 is relatively costly from a control engineering standpoint. The starting of the internal-combustion engine also is costly from a control engineering standpoint, because the power consumption of the internal-combustion engine 3 affects the drive of the vehicle, which has to be controlled.

The above-described hybrid systems are only examples and can be modified and supplemented in multiple manners. For example, the planetary transmission according to FIG. 4 can be replaced by a differential gearing similar to an axle differential. The hybrid systems described as examples makes possible that operation of the internal-combustion engine can be avoided in the low-power range and light-load range. Advantageously, two-cycle engines, which have a very simple construction, can therefore be used which, when used conventionally, have particular emission problems at a light load and at low rotational speeds. Furthermore, by suitably influencing the valve timing (variable valve overlaps, variable valve gears) and due to the lack of full-load enrichment, the internal-combustion engine can be constructed such that the conchoidal curves according to FIG. 1, below the best point, run into the full-load curve in each case from the right bottom toward the left top and, above the best point, from the left bottom toward the right top. In this case, at constant rotational speeds, the increasing power is in each case accompanied by a reduced specific fuel consumption.

By means of FIG. 6, a flow chart will be explained in the following, according to which the control device 18 operates in the following exemplary manner:

In a first Step 50, the required drive power of the vehicle is determined based on the operating conditions of the internal-combustion engine and the electric machine(s), as well as the accelerator pedal position. In Step 52, it is determined whether the battery is full. If so, in Step 54, the lowest possible rotational speed is determined based on the diagram of FIG. 1, at which the internal-combustion can run while taking into account the respective possible transmission ratios, in order to provide the required power. In Step 56, the specific fuel consumption of the internal-combustion engine under the conditions of Steps 50, 54 is then determined. In Step 58, it is determined whether the specific fuel consumption VBKM is greater than the effective specific fuel consumption ESVE, with which the operation can take place from the battery. If so, it is determined in Step 60 whether an electric operation is possible, i.e., whether the power can be provided electrically. If so, a switching to electrical drive takes place in Step 62. If the criterion of Step 58 or of Step 60 is not satisfied, the vehicle is driven by means of the drive of the internal-combustion engine (Step 64).

If it is determined in Step 52 that the battery can be recharged, it is determined in Step 66 whether the power determined in Step 50 is lower than the full-load power of the internal-combustion engine at the given possible transmission ratios. If so, the lowest possible rotational speed is determined in Step 68 at which the internal-combustion engine can generate the power required in Step 50 plus the nominal power of the generator. In Step 70, the specific fuel consumption is determined under the conditions of Steps 50 and 68. It is understood that it has to be determined in Step 66 that the power in Step 50 is sufficiently far below the full-load power so that Step 68 can be meaningfully implemented. After Step 70, the system switches to the internal-combustion engine drive with an additional charging of the battery by means of the generator. The specific fuel consumption determined in Step 70 is supplied to the control device, to which the power generated by the generator is also supplied, so that the specific fuel consumption ESVL can be determined with which the energy stored in the battery is generated.

If "no" is determined in Step 66, it is checked in Step 74 whether the power according to Step 50 is approximately in the range of the full-load power for the respective rotational speed. If so, a switching to the drive by only the internal-combustion engine takes place in Step 76.

If "no" is determined in Step 76, this means that, in addition to the drive by the internal-combustion engine, an electric drive is required, so that in Step 78 both types of drive are activated.

Figure 6:
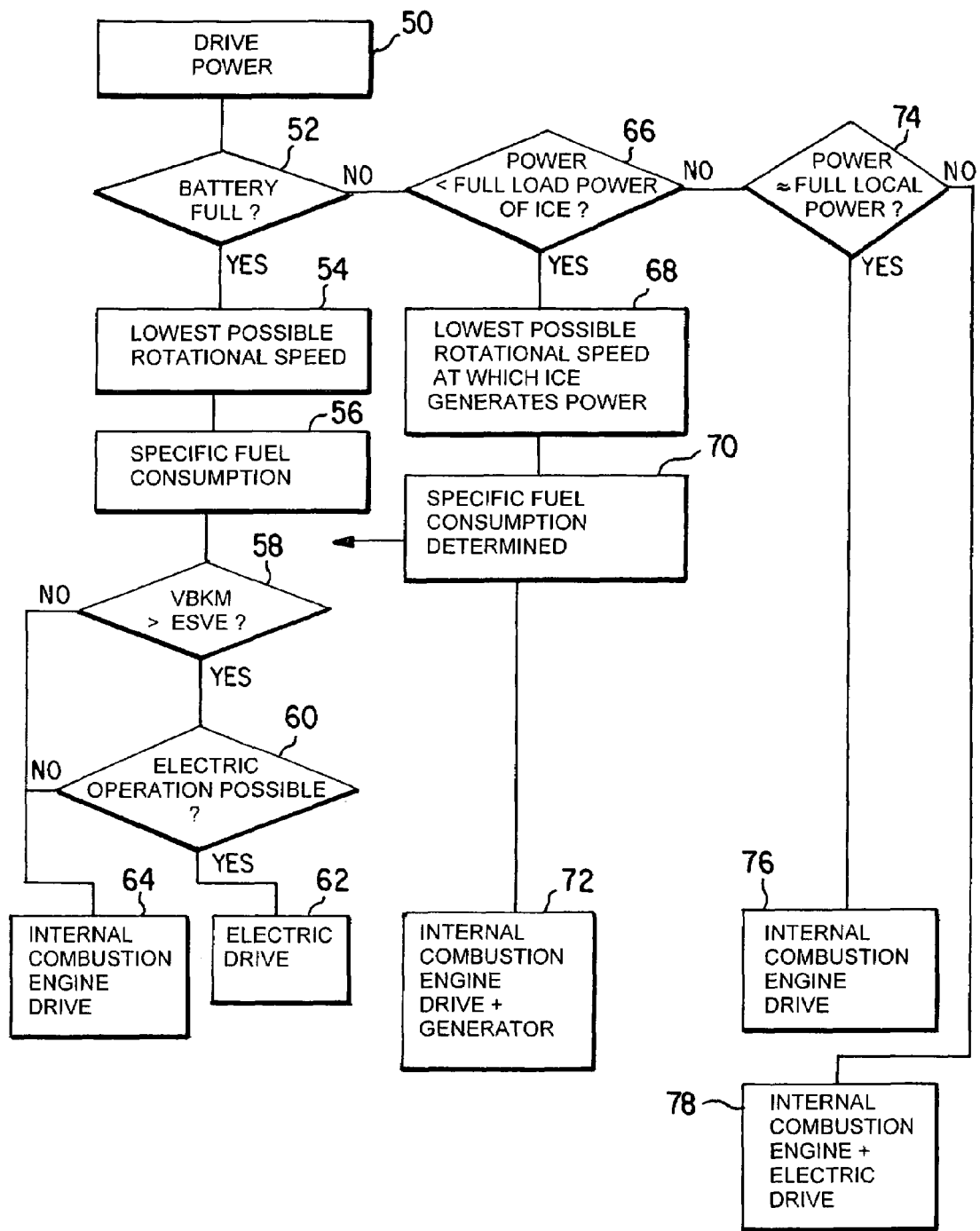
FIG. 6 is a flow chart for explaining an exemplary function of the inventive system.

It is understood that the flow chart according to FIG. 6 is only an example and that many different modifications are conceivable depending on the hybrid drive concept.

On the whole, the invention provides a way that fuel consumption of vehicles can be considerably decreased by means of hybrid drive systems. The fuel consumption decrease is greater as the internal-combustion engine becomes more powerful in comparison to the vehicle driving power required in predominantly partial load driving operations. A charge state detection device advantageously integrated in the control device (18) may operate, for example, according to the principle that (1) the energy stored in the battery is determined from the respective difference between the energy charged into the battery by the generator and the energy drawn out of the battery by the motor, or (2) the current balance of the battery is determined directly. Depending on the construction of the battery, the maximal charge and the minimal charge of the battery can be adapted.

The above-mentioned characteristics of a hybrid system according to the invention can be combined with one another in different fashions.

| Table of Reference Numbers | |
|---|---|
| 2 | internal-combustion engine |
| 4 | first clutch |
| 6 | electric machine |
| 8 | second clutch |
| 10 | transmission |
| 12 | differential |
| 14 | converter unit |
| 16 | energy accumulator |
| 18 | control device |
| 20 | electric machine |
| 22 | electric machine |
| 24 | clutch |
| 26 | planetary transmission |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A hybrid drive system for a vehicle, the hybrid drive system comprising:
    an internal combustion engine;
    an electric machine operable as an electric motor and a generator;
    a transmission having a continuously variable ratio;
    a first clutch coupling the internal combustion engine with the electric machine;
    a second clutch coupling the electric machine with the transmission, which transmission is connectable to a drive shaft of the vehicle;
    an electric energy accumulator;

a converter device for controlling energy flow between the electric machine and the electric energy accumulator;

an electric control device adapted to control the internal combustion engine, the transmission, the converter device and the first and second clutches as a function of a charge state of the energy accumulator and a drive power demand of the vehicle, the control device further adapted to control a starting of the internal combustion engine, when the second clutch is at least partially closed, by closing the first clutch;

wherein, during the starting of the internal combustion engine while driving the continuously variable ratio of the transmission is stepped down during the closing of the first clutch.

2. The hybrid drive system according to claim 1, wherein the control device is adapted to control the converter device and, as required, the first and second clutches such that the internal-combustion engine is used exclusively for driving the vehicle only if it is in an operating range in which the operation could also take place only with an electromotive drive, with a specific fuel consumption ESVE lower than ESVL/(G×B×M), wherein:

ESVL is an effective specific fuel consumption with which the generator was driven during the charging of the energy stored in the electric energy accumulator, G is the efficiency with which the generator converts the mechanical driving power into electric power, B is the efficiency with which the electric power generated in the generator is stored as energy in the electric energy accumulator and is supplyable to the drive motor, and M is the efficiency with which the electric power in the drive motor is convertible into mechanical energy.

3. The hybrid drive system according to claim 1, wherein the control device is adapted to control the converter device and, as required, the first and second clutches such that, at least when the accumulator is full, the vehicle is driven by the electric motor only if the respective driving power demand of the vehicle can be met by the internal-combustion engine only with a specific fuel consumption greater than ESVL/(G×B×M), wherein:

ESVL is the effective specific fuel consumption with which the generator was driven during the charging of the energy stored in the electric energy accumulator, G is the efficiency with which the generator converts the mechanical driving power into electric power, B is the efficiency with which the electric power generated in the generator is stored as energy in the electric energy accumulator and is supplyable to the drive motor, and M is the efficiency with which the electric power in the drive motor is convertible into mechanical energy.

4. The hybrid drive system according to claim 1, wherein the control device is adapted to control the converter device and, as required, the first and second clutches such that the electric energy accumulator does not fall below a predetermined charge state and, when the charge state of the energy accumulator decreases, the energy accumulator is charged by the generator driven by the internal-combustion engine even when the internal-combustion engine is running in an operating range in which its specific fuel consumption is increasingly higher than the minimal specific fuel consumption.

5. The hybrid drive system according to claim 1, wherein the control device is adapted to control the converter device and, as required, the first and second clutches such that the energy accumulator is charged in such a manner that the internal-combustion engine driving the generator and, as required additionally the vehicle, runs at operating points having a specific fuel consumption that decreases as the charge state of the energy accumulator increases.

6. The hybrid drive system according to claim 3, wherein the control device is adapted to control the system such that, during the charging of the energy accumulator, the generator is driven as close as possible to its rated power by the internal-combustion engine running corresponding to the required power output with the lowest possible specific fuel consumption.

7. The hybrid drive system according to claim 4, wherein the control device is adapted to control the system such that, during the charging of the energy accumulator, the generator is driven as close as possible to its rated power by the internal-combustion engine running corresponding to the required power output with the lowest possible specific fuel consumption.

8. The hybrid drive system according to claim 5, wherein the control device is adapted to control the system such that, during the charging of the energy accumulator, the generator is driven as close as possible to its rated power by the internal-combustion engine running corresponding to the required power output with the lowest possible specific fuel consumption.

9. The hybrid drive system according to claim 3, wherein the control device comprises:

a first memory device for storing a characteristic fuel consumption diagram which specifies the specific fuel consumption of the internal-combustion engine as a function of the power and the rotational speed of the internal-combustion engine, a second memory device for storing the respective value of ESVE, and an arithmetic-logic device which, based on the current drive power demand of the vehicle, the current vehicle speed and the available transmission ratios between the internal-combustion engine and the vehicle is adapted to compute the minimal specific fuel consumption with which the internal-combustion engine can drive the vehicle at the instantaneous drive power demand.

10. The hybrid drive system according to claim 4, wherein the control device comprises:

a first memory device for storing a characteristic fuel consumption diagram which specifies the specific fuel consumption of the internal-combustion engine as a function of the power and the rotational speed of the internal-combustion engine, a second memory device for storing the respective value of ESVE, and an arithmetic-logic device which, based on the current drive power demand of the vehicle, the current vehicle speed and the available transmission ratios between the internal-combustion engine and the vehicle is adapted to compute the minimal specific fuel consumption with which the internal-combustion engine can drive the vehicle at the instantaneous drive power demand.

11. The hybrid drive system according to claim 5, wherein the control device comprises:

a first memory device for storing a characteristic fuel consumption diagram which specifies the specific fuel consumption of the internal-combustion engine as a function of the power and the rotational speed of the internal-combustion engine, a second memory device for storing the respective value of ESVE, and an arithmetic-logic device which, based on the current drive power demand of the vehicle, the current vehicle speed and the available transmission ratios between the internal-combustion engine and the vehicle is adapted to compute the minimal specific fuel consumption with which the internal-combustion engine can drive the vehicle at the instantaneous drive power demand.

12. The hybrid drive system according to claim 2, wherein the control device comprises a charge state detection device for detecting the charge state of the energy accumulator, the charge state detection device being adapted to control the internal-combustion engine for driving the generator when the charge state has fallen below a predetermined value.

13. The hybrid drive system according to claim 3, wherein the control device comprises a charge state detection device for detecting the charge state of the energy accumulator, the charge state detection device being adapted to control the internal-combustion engine for driving the generator when the charge state has fallen below a predetermined value.

14. The hybrid drive system according to claim 4, wherein the control device comprises a charge state detection device for detecting the charge state of the energy accumulator, the charge state detection device being adapted to control the internal-combustion engine for driving the generator when the charge state has fallen below a predetermined value.

15. The hybrid drive system according to claim 5, wherein the control device comprises a charge state detection device for detecting the charge state of the energy accumulator, the charge state detection device being adapted to control the internal-combustion engine for driving the generator when the charge state has fallen below a predetermined value.

16. The hybrid drive system according to claim 2, wherein, at a drive power demand of the vehicle below the rated power of the drive motor, the control device is adapted to control the internal-combustion engine for driving the vehicle and the generator when the internal-combustion engine operates with a specific fuel consumption which is below the current value of ESVE.

17. The hybrid drive system according to claim 3, wherein, at a drive power demand of the vehicle below the rated power of the drive motor, the control device is adapted to control the internal-combustion engine for driving the vehicle and the generator when the internal-combustion engine operates with a specific fuel consumption which is below the current value of ESVE.

18. The hybrid drive system according to claim 4, wherein, at a drive power demand of the vehicle below the rated power of the drive motor, the control device is adapted to control the internal-combustion engine for driving the vehicle and the generator when the internal-combustion engine operates with a specific fuel consumption which is below the current value of ESVE.

19. The hybrid drive system according to claim 5, wherein, at a drive power demand of the vehicle below the rated power of the drive motor, the control device is adapted to control the internal-combustion engine for driving the vehicle and the generator when the internal-combustion engine operates with a specific fuel consumption which is below the current value of ESVE.

20. The hybrid drive system according to claim 2, wherein the control device contains a memory device, in which the drive power demand of the vehicle along a definable route is storable, and an arithmetic-logic device adapted to determine the operating modes of the hybrid drive system utilized along the defined route, while minimizing the resulting fuel consumption.

21. The hybrid drive system according to claim 2, wherein the maximal power of the internal-combustion engine corresponds at least to the drive power demand of the vehicle at the continuous maximal speed.

22. The hybrid drive system according to claim 2, wherein the internal-combustion engine is a 2-cycle internal-combustion engine.

23. The hybrid drive system according to claim 3, wherein the internal-combustion engine is a 2-cycle internal-combustion engine.

24. The hybrid drive system according to claim 4, wherein the internal-combustion engine is a 2-cycle internal-combustion engine.

25. The hybrid drive system according to claim 5, wherein the internal-combustion engine is a 2-cycle internal-combustion engine.

26. A hybrid drive system for a vehicle, the hybrid drive system comprising:
   an internal combustion engine;
   an electric machine operable as an electric motor and a generator;
   a transmission having a variable ratio;
   a first clutch coupling the internal combustion engine with the electric machine;
   a second clutch coupling the electric machine with the transmission, which transmission is connectable to a drive shaft of the vehicle;
   an electric energy accumulator;
   a converter device for controlling energy flow between the electric machine and the electric energy accumulator;
   an electric control device adapted to control the internal combustion engine, the transmission, the converter device and the first and second clutches as a function of a charge state of the energy accumulator and a drive power demand of the vehicle, the control device further adapted to control a starting of the internal combustion engine, when the second clutch is at least partially closed, by closing the first clutch;
   wherein, during the starting of the internal combustion engine, at least one of the following actions take place:
      (a) operation of the electric machine with an additional drive torque during the closing of the first clutch, and
      (b) reduction of the ratio of the transmission during the closing of the first clutch;
   wherein the control device is adapted to control the converter device and, as required, the first and second clutches such that the internal-combustion engine is used exclusively for driving the vehicle only if it is in an operating range in which the operation could also take place only with an electromotive drive, with a specific fuel consumption ESVE lower than ESVL/(G× B×M), wherein:
      ESVL is an effective specific fuel consumption with which the generator was driven during the charging of the energy stored in the electric energy accumulator,
      G is the efficiency with which the generator converts the mechanical driving power into electric power,
      B is the efficiency with which the electric power generated in the generator is stored as energy in the electric energy accumulator and is supplyable to the drive motor, and
      M is the efficiency with which the electric power in the drive motor is convertible into mechanical energy; and wherein the control device is adapted to control the system such that, during the charging of the energy accumulator, the generator is driven as close as possible to its rated power by the internal-combustion engine running corresponding to the required power output with the lowest possible specific fuel consumption.

27. A hybrid drive system for a vehicle, the hybrid drive system comprising:
an internal combustion engine;
an electric machine operable as an electric motor and a generator;
a transmission having a variable ratio;
a first clutch coupling the internal combustion engine with the electric machine;
a second clutch coupling the electric machine with the transmission, which transmission is connectable to a drive shaft of the vehicle;
an electric energy accumulator;
a converter device for controlling energy flow between the electric machine and the electric energy accumulator;
an electric control device adapted to control the internal combustion engine, the transmission, the converter device and the first and second clutches as a function of a charge state of the energy accumulator and a drive power demand of the vehicle, the control device further adapted to control a starting of the internal combustion engine, when the second clutch is at least partially closed, by closing the first clutch;
wherein, during the starting of the internal combustion engine, at least one of the following actions take place:
  (a) operation of the electric machine with an additional drive torque during the closing of the first clutch, and
  (b) reduction of the ratio of the transmission during the closing of the first clutch;
wherein the control device is adapted to control the converter device and, as required, the first and second clutches such that the internal-combustion engine is used exclusively for driving the vehicle only if it is in an operating range in which the operation could also take place only with an electromotive drive, with a specific fuel consumption ESVE lower than ESVL/(G× B×M), wherein:
  ESVL is an effective specific fuel consumption with which the generator was driven during the charging of the energy stored in the electric energy accumulator,
  G is the efficiency with which the generator converts the mechanical driving power into electric power,
  B is the efficiency with which the electric power generated in the generator is stored as energy in the electric energy accumulator and is supplyable to the drive motor, and
  M is the efficiency with which the electric power in the drive motor is convertible into mechanical energy; and
wherein the control device comprises:
a first memory device for storing a characteristic fuel consumption diagram which specifies the specific fuel consumption of the internal-combustion engine as a function of the power and the rotational speed of the internal-combustion engine,
a second memory device for storing the respective value of ESVE, and
an arithmetic-logic device which, based on the current drive power demand of the vehicle, the current vehicle speed and the available transmission ratios between the internal-combustion engine and the vehicle is adapted to compute the minimal specific fuel consumption with which the internal-combustion engine can drive the vehicle at the instantaneous drive power demand.

28. A hybrid drive system for a vehicle, the hybrid drive system comprising:
an internal combustion engine;
an electric machine operable as an electric motor and a generator;
a transmission having a variable ratio;
a first clutch coupling the internal combustion engine with the electric machine;
a second clutch coupling the electric machine with the transmission, which transmission is connectable to a drive shaft of the vehicle;
an electric energy accumulator;
a converter device for controlling energy flow between the electric machine and the electric energy accumulator;
an electric control device adapted to control the internal combustion engine, the transmission, the converter device and the first and second clutches as a function of a charge state of the energy accumulator and a drive power demand of the vehicle, the control device further adapted to control a starting of the internal combustion engine, when the second clutch is at least partially closed, by closing the first clutch;
wherein, during the starting of the internal combustion engine, at least one of the following actions take place:
  (a) operation of the electric machine with an additional drive torque during the closing of the first clutch, and
  (b) reduction of the ratio of the transmission during the closing of the first clutch;
wherein the control device is adapted to control the converter device and, as required, the first and second clutches such that the internal-combustion engine is used exclusively for driving the vehicle only if it is in an operating range in which the operation could also take place only with an electromotive drive, with a specific fuel consumption ESVE lower than ESVL(G× B×M), wherein:
  ESVL is an effective specific fuel consumption with which the generator was driven during the charging of the energy stored in the electric energy accumulator,
  G is the efficiency with which the generator converts the mechanical driving power into electric power,
  B is the efficiency with which the electric power generated in the generator is stored as energy in the electric energy accumulator and is supplyable to the drive motor, and
  M is the efficiency with which the electric power in the drive motor is convertible into mechanical energy; and
wherein the rated driving power of the generator corresponds to the power which the internal-combustion engine supplies at a predetermined specific fuel consumption and the corresponding lowest rotational speed.

29. A hybrid drive system for a vehicle, the hybrid drive system comprising:
an internal combustion engine;
an electric machine operable as an electric motor and a generator;
a transmission having a variable ratio;
a first clutch coupling the internal combustion engine with the electric machine;

a second clutch coupling the electric machine with the transmission, which transmission is connectable to a drive shaft of the vehicle;
an electric energy accumulator;
a converter device for controlling energy flow between the electric machine and the electric energy accumulator;
an electric control device adapted to control the internal combustion engine, the transmission, the converter device and the first and second clutches as a function of a charge state of the energy accumulator and a drive power demand of the vehicle, the control device further adapted to control a starting of the internal combustion engine, when the second clutch is at least partially closed, by closing the first clutch;
wherein, during the starting of the internal combustion engine, at least one of the following actions take place:
  (a) operation of the electric machine with an additional drive torque during the closing of the first clutch, and
  (b) reduction of the ratio of the transmission during the closing of the first clutch;
wherein the control device is adapted to control the converter device and, as required, the first and second clutches such that the internal-combustion engine is used exclusively for driving the vehicle only if it is in an operating range in which the operation could also take place only with an electromotive drive, with a specific fuel consumption ESVE lower than ESVL/(G× B×M), wherein:
  ESVL is an effective specific fuel consumption with which the generator was driven during the charging of the energy stored in the electric energy accumulator,
  G is the efficiency with which the generator converts the mechanical driving power into electric power,
  B is the efficiency with which the electric power generated in the generator is stored as energy in the electric energy accumulator and is supplyable to the drive motor, and
  M is the efficiency with which the electric power in the drive motor is convertible into mechanical energy; and
wherein the rated driving power of the generator corresponds at least to the power which the internal-combustion engine maximally supplies at its lowest permissible loaded rotational speed.

30. A hybrid drive system for a vehicle, the hybrid drive system comprising:
an internal combustion engine;
an electric machine operable as an electric motor and a generator;
a transmission having a variable ratio;
a first clutch coupling the internal combustion engine with the electric machine;
a second clutch coupling the electric machine with the transmission, which transmission is connectable to a drive shaft of the vehicle;
an electric energy accumulator;
a converter device for controlling energy flow between the electric machine and the electric energy accumulator;
an electric control device adapted to control the internal combustion engine, the transmission, the converter device and the first and second clutches as a function of a charge state of the energy accumulator and a drive power demand of the vehicle, the control device further adapted to control a starting of the internal combustion engine, when the second clutch is at least partially closed, by closing the first clutch;
wherein, during the starting of the internal combustion engine, at least one of the following actions take place:
  (a) operation of the electric machine with an additional drive torque during the closing of the first clutch, and
  (b) reduction of the ratio of the transmission during the closing of the first clutch;
wherein the control device is adapted to control the converter device and, as required, the first and second clutches such that the internal-combustion engine is used exclusively for driving the vehicle only if it is in an operating range in which the operation could also take place only with an electromotive drive, with a specific fuel consumption ESVE lower than ESVL/(G× B×M), wherein:
  ESVL is an effective specific fuel consumption with which the generator was driven during the charging of the energy stored in the electric energy accumulator,
  G is the efficiency with which the generator converts the mechanical driving power into electric power,
  B is the efficiency with which the electric power generated in the generator is stored as energy m the electric energy accumulator and is supplyable to the drive motor, and
  M is the efficiency with which the electric power in the drive motor is convertible into mechanical energy; and
wherein the rated motor power is at least approximately as large as the rated generator power multiplied by the product of B and M.

* * * * *